US009465641B2

(12) United States Patent
Ryu et al.

(10) Patent No.: US 9,465,641 B2
(45) Date of Patent: Oct. 11, 2016

(54) SELECTING CLOUD COMPUTING RESOURCE BASED ON FAULT TOLERANCE AND NETWORK EFFICIENCY

(71) Applicant: KT CORPORATION, Gyeonggi-do (KR)

(72) Inventors: Jung-Hun Ryu, Seoul (KR); Kyung-Ah Kim, Seoul (KR); Jin-Ho Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/582,833

(22) Filed: Dec. 24, 2014

(65) Prior Publication Data

US 2015/0178117 A1    Jun. 25, 2015

(30) Foreign Application Priority Data

Dec. 24, 2013  (KR) ........................ 10-2013-0162751

(51) Int. Cl.
*G06F 9/455* (2006.01)
*H04L 29/08* (2006.01)
*G06F 9/50* (2006.01)

(52) U.S. Cl.
CPC ......... *G06F 9/45558* (2013.01); *G06F 9/5005* (2013.01); *G06F 9/5077* (2013.01); *H04L 67/1008* (2013.01); *G06F 2009/45562* (2013.01)

(58) Field of Classification Search
CPC ..... H04L 67/10; G06F 9/45558; G06F 9/50; G06F 2009/45562
USPC .......................................................... 718/1
See application file for complete search history.

(56) References Cited

U.S. PATENT DOCUMENTS

| 8,533,724 | B1 | 9/2013 | Theimer et al. |
| 2009/0210527 | A1* | 8/2009 | Kawato ............... G06F 9/45558 709/224 |
| 2013/0097319 | A1 | 4/2013 | Ahmad et al. |
| 2014/0215481 | A1* | 7/2014 | Piet .......................... G06F 11/16 718/104 |
| 2015/0052524 | A1* | 2/2015 | Raghu ..................... G06F 9/455 718/1 |
| 2015/0309828 | A1* | 10/2015 | Shaik .................. G06F 9/45558 718/1 |
| 2015/0331706 | A1* | 11/2015 | Hintermeister ..... G06F 9/45558 718/1 |

FOREIGN PATENT DOCUMENTS

| JP | 5110315 B2 | 12/2012 |
| JP | 2013-239095 A | 11/2013 |
| KR | 10-2010-0070901 A | 6/2010 |
| KR | 10-2013-0019698 A | 2/2013 |

* cited by examiner

*Primary Examiner* — John Chavis
(74) *Attorney, Agent, or Firm* — IP Legal Services, LLC

(57) ABSTRACT

The disclosure is related to selecting and allocating one of resources in a cloud computing system to create a virtual machine. A control server may determine a resource selection reference by selecting one of fault-tolerance and network efficiency upon receipt of a request message for creating a target virtual machine. The control server may calculate at least one of a fault-tolerance point and a network efficiency point of each candidate resource according to the selected resource selection reference. The control server may select one of candidate resources to create a requested virtual machine based on at least one of the calculated fault-tolerance point and the calculated network efficiency point of the candidate resources.

19 Claims, 6 Drawing Sheets

SELECTING CLOUD COMPUTING RESOURCE BASED ON FAULT TOLERANCE AND NETWORK EFFICIENCY

CROSS REFERENCE TO PRIOR APPLICATIONS

The present application claims priority under 35 U.S.C. §119 to Korean Patent Application No. 10-2013-0162751 (filed on Dec. 24, 2013).

BACKGROUND

The present disclosure relates to cloud computing, more particularly, to selecting and allocating physical resources of a cloud computing system for creating virtual machines in consideration of fault tolerance and network efficiency.

Software defined networking (SDN) has been introduced. Software defined networking may allow network administrators to manage network services through abstraction of lower-level functionality. Software defined networking may logically include a control plane that makes decisions about where traffic is sent and a data plane that forward traffic to the selected destination. Software defined network requires a method for the control plane to communicate with the data plane. Software defined network may simplify a communication networking and improve controllability and flexibility of a communication network.

Such software defined network has been applied to cloud computing environment. In particular, network functions virtualization (NFV) is a network architecture concept that proposes using IT virtualization related technologies to virtualize entire classes of network node functions into building blocks that may be connected, or chained, together to create communication services. In order to apply software defined network and network functions virtualization to a communication network, it requires a virtual machine allocation policy that provides high network efficiency and fault-tolerance for preventing performance deterioration in virtual environment.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a virtual machine may be created by selecting at least one of cloud computing resources in a cloud computing system in consideration of fault tolerance and network efficiency of cloud computing resources.

In accordance with another aspect of the present invention, virtual machines may be places at one of cloud computing resources, selected based on fault tolerance relation and network efficiency relation among the cloud computing resources.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
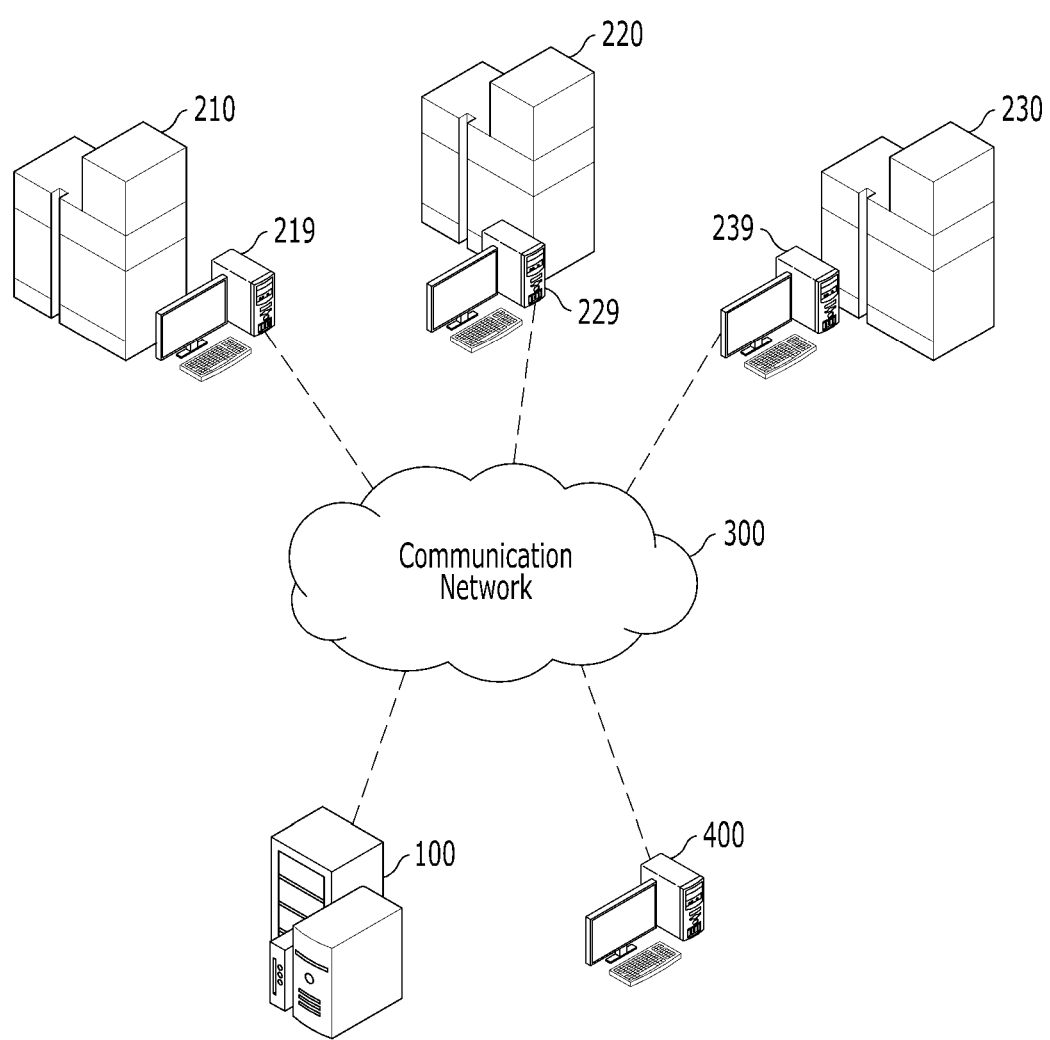
FIG. 1 illustrates a cloud computing environment including a control server for allocating optimal cloud computing resources for creating a virtual machine in consideration of fault tolerance and network efficiency in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, cloud computing resources may be selected and allocated for creating a target virtual machine in consideration of fault-tolerance and network efficiency between the target virtual machine and associated virtual machines included in a cloud computing system. In particular, an evolved packet core network may be virtualized to an efficient and simplified virtualized communication network by virtualizing at least one of constituent elements of the evolved packet core network (e.g., serving gateway and packet data network gateway) through selecting optimal cloud computing resources based on fault-tolerance and network efficiency. Hereinafter, an overall view of selecting and allocating an optimal cloud computing resource for creating a virtual machine in accordance with at least one embodiment will be described with reference to FIG. 1.

FIG. 1 illustrates a cloud computing environment including a control server for allocating optimal cloud computing resources for creating a virtual machine in consideration of fault tolerance and network efficiency in accordance with at least one embodiment.

Referring to FIG. 1, control server 100 may be coupled to cloud computing system 200 through communication network 300 and communicate with cloud computing system 200 through communication network 300 as well as other entities coupled to communication network 300. Such control server 100 may be a computing system of a service provider for selecting or allocating optimal cloud computing resources to create a virtual machine. In particular, control server 100 receives a request message for creating a virtual machine from client device 400, selects at least one of cloud computing resources for creating the requested virtual machine in consideration of various factors including fault tolerance and network efficiency, and creating the requested virtual machine with the selected at least one cloud computing resource in accordance with at least one embodiment.

Such control server 100 may include a processor, a memory, and a communication circuit. The processor may be a central processing unit (CPU) for performing a predetermined operation based on information stored in the memory. The memory may store various types of information for performing operation associated with selecting cloud computing resources for creating a virtual machine. The communication circuit may communicate with other entities coupled to communication network 200.

Control server 100 is illustrated as an independent entity separated from cloud computing system 200 in FIG. 1. However, the present invention is not limited thereto. Control server 100 may be included in cloud computing system 200.

Cloud computing system 200 may be a group of computers coupled through a communication network (e.g., communication network 300), logically divide and manage computing resources (e.g., cloud computing resources) of the associated computers. In response to a request message to perform a predetermined operation, cloud computing system 200 may logically select and combine necessary computing resources and perform the requested operation using the logically selected and combined computing resources.

Such cloud computing system 200 may include a plurality of cloud computing centers 210, 220, and 230. Such cloud computing centers 210, 220, and 230 may be coupled to each other through corresponding gateways 219, 229, and 239. Each one of cloud computing centers 210, 220, and 230 may include a plurality of servers. Such servers may include a control node, application servers, and storage servers. Cloud computing system 200 will be described in more detail with reference to FIG. 2.

Communication network 300 may be a telecommunication network that enables a node to communicate to the other node coupled thereto. For example, communication network 300 may include a point to point network, a broadcast network, a wide area network, a local area network, a computer network, a telephone network, the Internet, a data communication network, a wireless communication network, a wired communication network, an asynchronous transfer mode (ATM) network, a synchronous optical network (SONET) network, a synchronous digital hierarchy (SDH) network, and so forth.

Client device 400 may be a computing device of a user registered for a corresponding service of cloud computing system 200 or control server 100. Such client device 400 may include a personal computer, a laptop computer, a portable computing device, a smart phone, a pad-like device, and so forth. In accordance with at least one embodiment, client device 400 may generate a request message for creating a target virtual machine upon generation of a predetermined event and transmit the created request message to control server 100 through communication network 200. Such a request message may include information on a type of a target virtual machine to create, identification of a user, requirements of the target virtual machine, and so forth.

As described, cloud computing system 200 may have various type of computing resources and the cloud computing resources are logically divided and managed. Hereinafter, a hierarchical structure of cloud computing system 200 will be described in detail with reference to FIG. 2.

Figure 2:
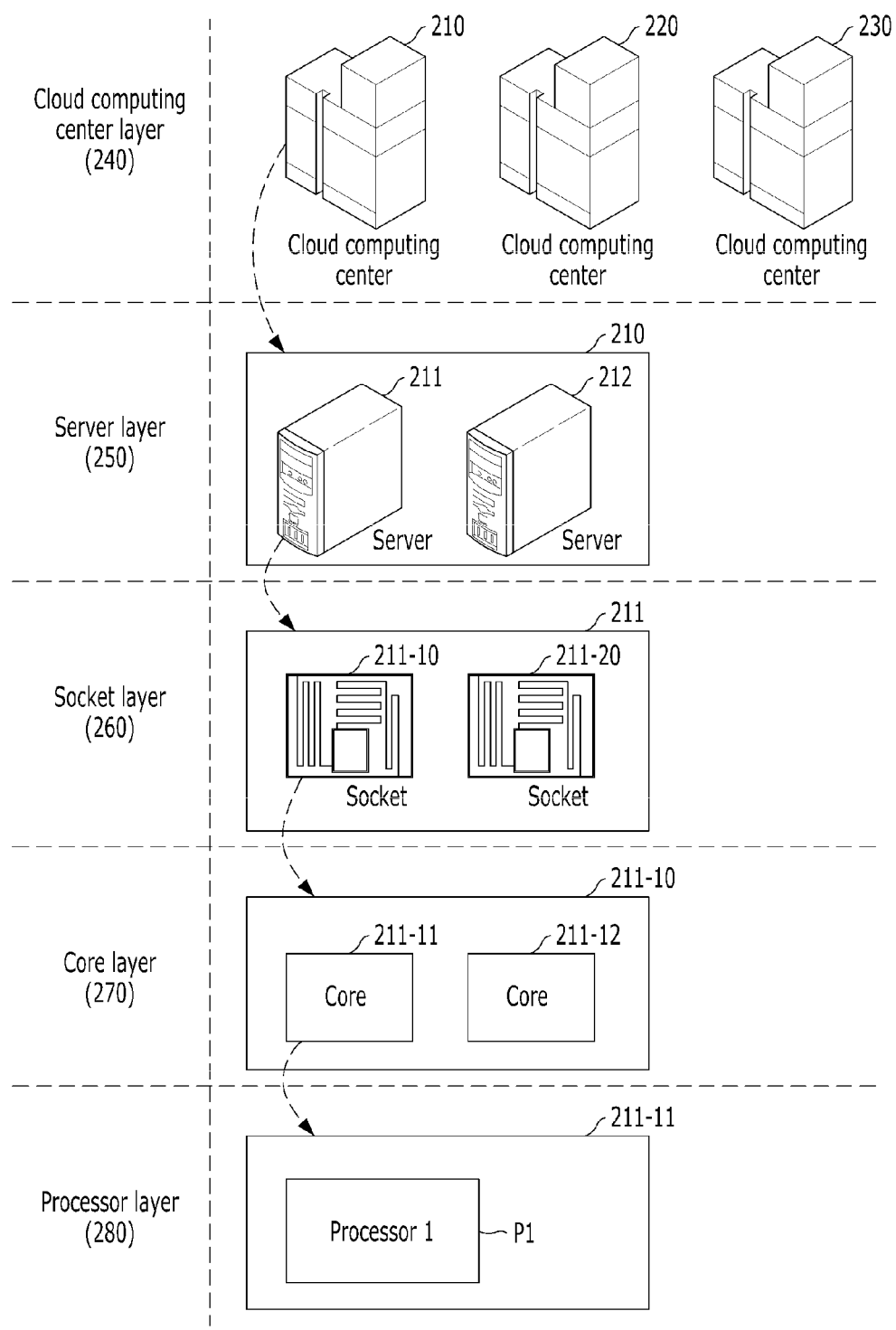
FIG. 2 illustrates a hierarchical structure of a cloud computing system.

FIG. 2 illustrates a hierarchical structure of a cloud computing system.

Referring to FIG. 2, cloud computing system 200 may virtualize physical computing resources to logical computing resources, manage such virtualized logical computing resources, and enable the logical computing resources to be shared. The physical computing resources may include central processing units (CPU), random access memories (RAM) and disks, as storages, and so forth, which are included in a plurality of physical computers (e.g., servers) included in cloud computing system 200. For convenience and ease of understanding, processing resources (e.g., CPU) among various resources will be used as an example to describe embodiments of the present invention, but the present invention is not limited thereto.

Cloud computing system 100 may have a hierarchical structure which is logically divided into cloud computing center layer 240, server layer 250, socket layer 260, core layer 270, and processor layer 280, as shown in FIG. 2. Cloud computing center layer 240 may denote a group of cloud computing centers 210, 220, and 230 and is the highest layer. Each one of cloud computing centers 210, 220, and 230 may be a computing center of a cloud service provider. Server layer 250 may denote a group of servers (e.g., 310 and 320 in FIG. 3) included in each cloud computing center (e.g., 210 in FIG. 1). Socket layer 260 may denote a group of sockets 311 and 312 included in each server (e.g., 310). Core layer 270 may denote a group of cores included in each socket, and processor layer 280 may denote a group of logical processors, such as a hyper-threading (HT) included in each core. Processor layer 280 is the lowest layer.

In accordance with at least one embodiment, one of logical processors in processor layer 280 may be selected for creating a target virtual machine in consideration of fault-tolerance and network efficiency among the target virtual machine and associated and interactive virtual machines. Fault-tolerance in cloud computing system 200 denotes the property that enables cloud computing system 200 to continue predetermined operating properly in an event of failure of virtual machines created in cloud computing system 200. Such fault-tolerance may increase by creating virtual machines performing the same operation in different cloud computing centers. That is, two virtual machines performing the same operation may be created using processors in different cloud computing centers (e.g., 210 and 220) or different servers (e.g., 211 and 212). If two virtual machines performing the same operation are created in the same cloud computing center or the same server and the cloud computing center or the server is accidently turned off by any reason, such as natural disaster or operator's mistake, two virtual machines become malfunctioned at the same time. Accordingly, in order to improve the fault-tolerance, it is better to create virtual machines performing the same operation (e.g., the same type of virtual machines) using processors each included in a different server or a different cloud computing center.

Network Efficiency in cloud computing system 200 denotes efficiency in data communication between virtual machines. For example, network efficiency may be improved when two associated and interactive virtual machines are placed in processors physically close to each other. Accordingly, when two associated and interactive virtual machines perform different operations (e.g., different type of virtual machines), network efficiency is the major selection reference to select and allocate cloud computing resources to create the virtual machines. That is, it is better to select processors in the same cloud computing center or the same server to improve the network efficiency.

As described, the fault-tolerance is in inverse proportion to the network efficiency. For example, when two virtual machines are created using cloud computing resources in the same cloud computing center or in the same server, two virtual machines may have comparatively high network efficiency but comparatively low fault-tolerance. On the contrary, when two virtual machines are created using cloud computing resources in different cloud computing centers or in the different servers, two virtual machines may have comparatively low network efficiency but have comparatively high fault-tolerance.

In accordance with at least one embodiment, such fault-tolerance and network efficiency may be considered to select and allocate optimal cloud computing resources to create virtual machines. In particular, a fault-tolerance point and a network efficiency point of candidate cloud computing resource and an interactive point between a candidate resource and an interactive resource may be calculated and one of the candidate cloud computing resources may be selected based on the calculated fault tolerance point, the calculated network efficiency point, and the interactive point. Hereinafter, such calculation and selection operation will be described in detail with reference to FIG. 3. For convenience and ease of understanding, a calculation method will be described based on server 211 in cloud computing center 210

Figure 3:
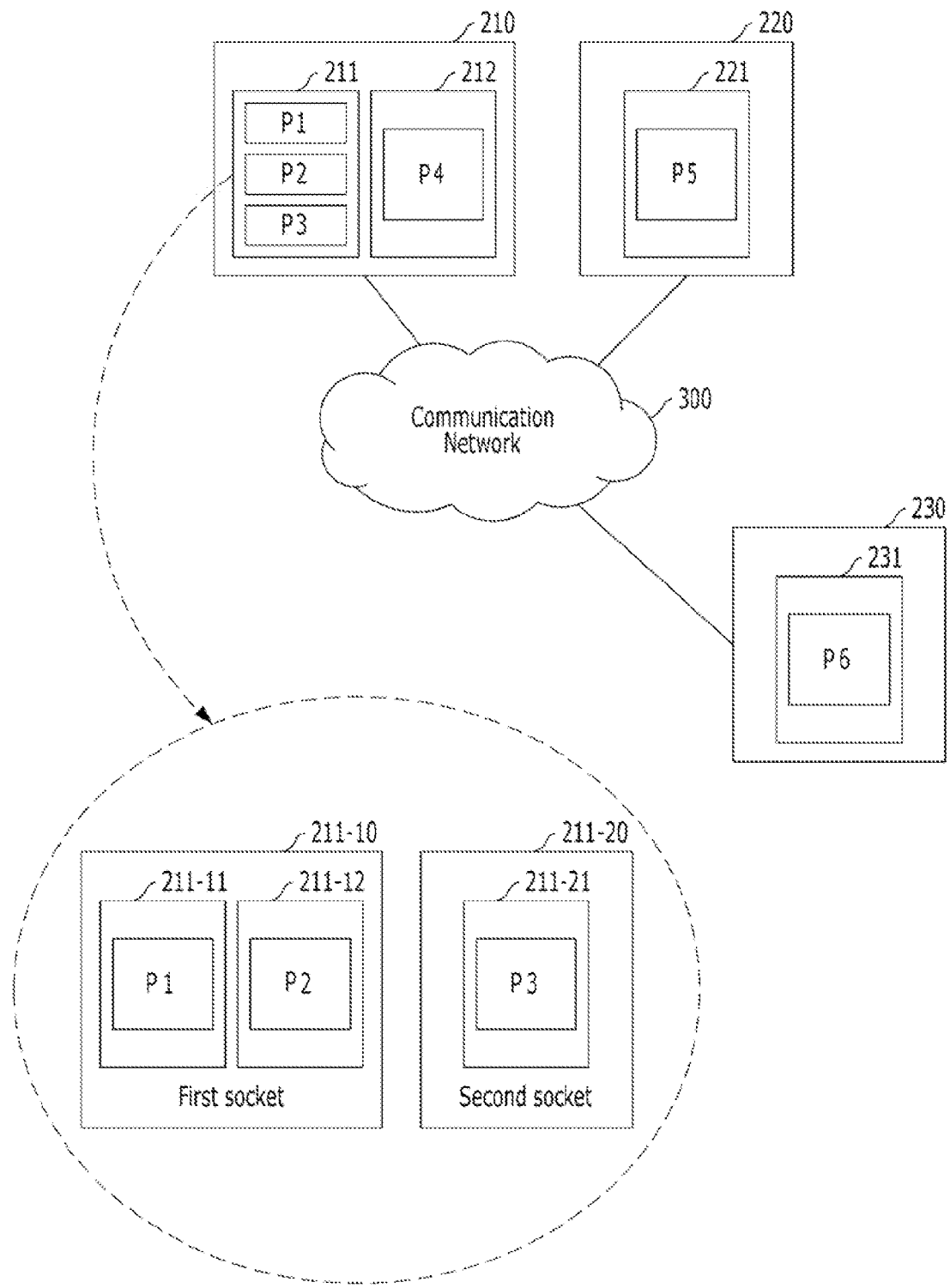
FIG. 3 illustrates optimal cloud computing resource in accordance with at least one embodiment.

FIG. 3 illustrates optimal cloud computing resource in accordance with at least one embodiment.

Referring to FIG. 3, cloud computing system 200 may include available processing resources P1, P2, P3, P4, and P5 as cloud computing resources. For example, cloud computing system 200 includes first, second, and third cloud computing centers 210, 220, and 230. First cloud computing center 210 includes first and second servers 211 and 212 and Second cloud computing center 220 includes third server 221. Third cloud computing center 230 include fourth server 231. For convenience and ease of understanding, it is assumed that first server 211 has three processing resources P1, P2, and P3, second server 212 has one processing resource P4, third server 213 has one processing resource P5, and fourth server 214 has one processing resource P6. In particular, first server 211 includes two sockets 211-10 and 211-20, first socket 211-10 includes two cores 211-11 and 211-12 each having first processor P1 and second processor P2, and second socket 211-20 include third processor P3. In addition, a first type virtual machine is previously created by allocating first processing resource 210. Under this assumption, client device 400 requests to create a second type virtual machine to control server 100 in order to perform a predetermined operation in cooperation with the first type virtual machine. That is, the second type virtual machine does not perform the same operation as the first type virtual machine but interacts with the first type virtual machine to perform a predetermined operation. Such virtual machines are referred to as interactive virtual machines in accordance with at least one embodiment. In particular, the first type virtual machine may be a virtual machine for a serving gateway (S-GW) and the second type virtual machine may be a virtual machine for a packet data network gateway (P-GW) in an evolved packet core network when the evolved packet core network is virtualized.

Upon the receipt of the request, control server 100 may collect information on available resources, virtual machines, and properties of each available resources and virtual machines in cloud computing system 200. For example, control server 100 may transmit a request message to cloud computing system 200 to provide information on available cloud computing resources (e.g., processors) and virtual machines therein. In response to the request message, control server 100 may receive the information on available cloud computing resources from cloud computing system 200. As described, cloud computing system 200 has processing resources P1, P2, P3, P4, and P5 as available processing resources. Control server 210 may receive information on processing resources P1, P2, P3, P4, and P5 as available processing resources from cloud computing system 200. In addition, the information may include information on the priorities such as a network load, a processing load, an expected data traffic amount with an associated resource or virtual machine, and so forth.

Based on the received information and the information on the target virtual machine to create, control server 100 may determine whether the same type virtual machine is previously created using one of resources in cloud computing system 200 or control server 100 may search for an interactive virtual machine. In case of the virtualization of the evolved packet core network, a virtual machine for a serving gateway may be an interactive virtual machine for a virtual machine of a packet data network gateway. As described, cloud computing system 200 does not include the same type virtual machine because the requested virtual machine is the second type. In this case, control server 100 decides the network efficiency as the resource selection reference for selecting processing resources, search for the interactive virtual machine (e.g., the first type virtual machine) created in the cloud computing system 200, calculate a network efficiency point and an interactive point based on a candidate resource and the interactive virtual machine. When only one interactive virtual machine is included in an associated cloud computing system, a processing resource having a highest network efficiency point will be selected for the second type virtual machine. When multiple interactive virtual machine are included, a processing resource having a highest total point of the network efficiency point and an interactive point will be selected to create the second type virtual machine, which is currently requested to create.

In accordance with at least one embodiment, a network efficiency point may be estimated as follows: i) control server 100 may select candidate resources from available resources based on requirements of the second type virtual machine (e.g., processing power, so forth); ii) detect an interactive virtual machine of the second type virtual machine; iii) determine a common lowest hierarchical layer between a candidate processing resource and a processing resource allocated to the detected interactive virtual machine; and iv) estimate a network efficiency point based on the determined common lowest hierarchical layer.

An interactive point may be estimated as follows: i) control server 100 may search for an interactive virtual machine based on information on the target virtual machine to create and information on virtual machines already created in an associated cloud computing center; ii) obtain an expected data traffic amount between a candidate resource and the interactive virtual machine; and iii) estimate an interactive point based on the obtained expected data traffic amount. Such an expected data traffic amount may be obtained from an associated cloud computing center including the interactive virtual machine. The expected data traffic amount may be estimated based on a data processing amount or a processing load of the interactive virtual machine. For example, in case of an evolved packet core network, a serving gateway virtual machine needs to communicate with a packet data network gateway virtual machine. When the service gateway virtual machine has a high processing load or a high data processing amount, a large data traffic amount will be generated between the service gateway virtual machine and the packet data network gateway virtual machine.

As described, the interactive point may be the expected data traffic amount between the interactive virtual machine and a candidate resource, but the present invention is not limited thereto. Other factors influencing communication between the interactive virtual machine and a candidate resource may be used to estimate the interactive point.

When multiple interactive virtual machines are detected, each candidate resource will have multiple interactive points. In this case, a total network efficiency point may be calculated based on multiple network efficiency points and interactive points of each candidate resource. That is, when a candidate resource B_1 has two interactive virtual machines A_1 and A_2, a total point may be calculated as follows: i) a first network efficiency point between B_1 to A_1 is calculated; ii) a first interactive point between B_1 to A_1 is calculated; iii) a second network efficiency point between B_1 to A_2 is calculated; iv) a second interactive point between B_1 to A_2 is calculated; v) a total point of the candidate resource B_1 is calculated by (the first network efficiency point * the first interactive point)+(the second network efficiency point*the second interactive point), where * is multiplication. After calculating the total point of the candidate resource B_1, total points of all other candidate resources B_2, B_3, and B_4 are calculated. Then, one having the highest total point will be selected as the optimal resource to create the target virtual machine.

However, the present invention is not limited to only one method. For example, when multiple interactive virtual machines are detected, one of the multiple interactive virtual machines may be selected, as a representative interactive virtual machine, based on various factors which may be set by at least one of a system designer, an operation, a user, and a service provider. For example, a predetermined property of a server associated with each of the multiple interactive virtual machines may be determined and a virtual machine included in a server having a highest level or a lowest level may be selected as the representative interactive virtual machine from the multiple interactive virtual machines. Such a predetermined property may include a processing power, a traffic amount, a network bandwidth, a storage space, and so forth. A network efficiency point of each candidate processing resource may be calculated based on a common lowest hierarchical layer between a processing resource of the representative interactive virtual machine and each candidate processing resource.

Furthermore, when the multiple interactive virtual machines are detected, one of a server and a socket including the most interactive virtual machines may be selected from servers and sockets associated with the detected multiple interactive virtual machines. A network efficiency point of each candidate processing resource may be calculated based on a common lowest hierarchical layer between the selected server or the selected socket and each candidate processing resource.

The network efficiency point of a candidate resource may be estimated as follows. For example, control server 100 may i) assign 40 points to a candidate resource when a common lowest hierarchical layer between a hierarchical layer of the candidate processing resource and a hierarchical layer of an interactive virtual machine is a socket layer; ii) assign 30 points to a candidate resource when a common lowest hierarchical layer between a hierarchical layer of the candidate processing resource and a hierarchical layer of an interactive virtual machine is a server layer; iii) assign 20 points to a candidate resource when a common lowest hierarchical layer between a hierarchical layer of the candidate processing resource and a hierarchical layer of an interactive virtual machine is a clod computing center layer; and iv) assign 10 points to a candidate resource when the candidate resource and a resource of an interactive virtual machine are included in different cloud computing centers.

As described, the first type virtual machine is created using processor P1 included in first socket 211-10 and the first type virtual machine is an interactive virtual machine of the second type virtual machine. In this case, the candidate resource P2 is assigned with network efficiency point of 40 because the lowest common hierarchical layer between a processing resource of the first type virtual machine and the candidate resource P2 is a socket layer. Furthermore, the candidate resource P3 is assigned with network efficiency point of 30 because the lowest common hierarchical layer between a processing resource of the first type virtual machine and the candidate resource P3 is a server layer. The candidate resource P4 is assigned with network efficiency point of 20 because the lowest common hierarchical layer between a processing resource of the first type virtual machine and the candidate resource P4 is a cloud computing layer. The candidate resource P5 is assigned with network efficiency point of 10 because the candidate resource P4 is located in a cloud computing center different from that of the first type virtual machine. Accordingly, based on the network efficiency point, the processing resource P2 is selected to create the second type virtual machine in accordance with at least one embodiment.

After creating the second type virtual machine using the processing resource P2, client device 400 may request creation of a new second type virtual machine to control server 100. Since cloud computing system 200 already has the same type virtual machine, a resource selection reference may be determined as the fault-tolerance. That is, control server 100 may estimate a fault-tolerance point of a candidate resource as follows: i) control server 100 may select candidate resources from available resources based on requirements of a requested new second type virtual machine (e.g., processing power); ii) obtain information on a same type virtual machine; iii) determine a common lowest hierarchical layer between a candidate processing resource and a processing resource allocated to the same type virtual machine; and iv) estimate a fault tolerance point based on the determined common lowest hierarchical layer.

When a plurality of same type virtual machines are detected, one of the same type virtual machines may be selected, as a representative same type virtual machine, based on various factors which may be set by at least one of a system designer, an operation, a user, and a service provider. For example, a predetermined property of a server associated with each of the multiple same type virtual machines may be determined and a virtual machine included in a server having a highest level or a lowest level in the predetermined property may be selected as the representative same type virtual machine from the multiple same type virtual machines. Such a predetermined property may include a processing power, a traffic amount, a network bandwidth, a storage space, and so forth. A fault-tolerance point of each candidate processing resource may be calculated based on a common lowest hierarchical layer between a processing source allocated to the selected same type virtual machine and each candidate processing resource Furthermore, when a plurality of same type virtual machines are detected, one of a server and a socket including the most same type virtual machines may be selected from servers and sockets associated with the detected multiple same type virtual machines. A fault-tolerance point of each candidate processing resource may be calculated based on a common lowest hierarchical layer between the selected server or the selected socket and each candidate processing resource.

The fault-tolerance point of a candidate resource may be estimated based on the common lowest hierarchical layer between a processing resource of the same type virtual machine and each candidate processing resource as follows. For example, control server 100 may i) assign 40 points to a candidate resource when there is no common hierarchical layer between a hierarchical layer of the candidate processing resource and the reference hierarchical layer of the same type virtual machines; ii) assign 30 points to a candidate resource when a common lowest hierarchical layer between the candidate processing resource and a processing resource of the same type virtual machines is a cloud computing center layer; iii) assign 20 points to a candidate resource when a common lowest hierarchical layer between the candidate processing resource and a processing resource of the same type virtual machines is a server layer; and iv) assign 10 points to a candidate resource when a common lowest hierarchical layer between the candidate processing resource and a processing resource of the same type virtual machines is a socket layer.

Since the first and second processing resources P1 and P2 are not available, control server 100 may estimate the fault-tolerance points of the candidate resources P3, P4, and P5 as follows. The candidate resource P3 is assigned with a fault-tolerance point of 20 because the highest common hierarchical layer between a processing resource of the first type virtual machine and the candidate resource P3 is a server layer. The candidate resource P4 is assigned with a fault-tolerance point of 30 because the highest common hierarchical layer between a processing resource of the first type virtual machine and the candidate resource P4 is a cloud computing layer. The candidate resource P5 is assigned with a fault-tolerance point of 40 because the candidate resource P4 is located in a cloud computing center different from that of the first type virtual machine. Accordingly, based on the fault-tolerance point, the processing resource P5 is selected to create the newly requested second type virtual machine in accordance with at least one embodiment.

Hereinafter, an operation of control server 100 to select and allocate an optimal cloud computing resource to create a virtual machine in accordance with at least one embodiment will be described with reference to FIG. 4.

Figure 4:
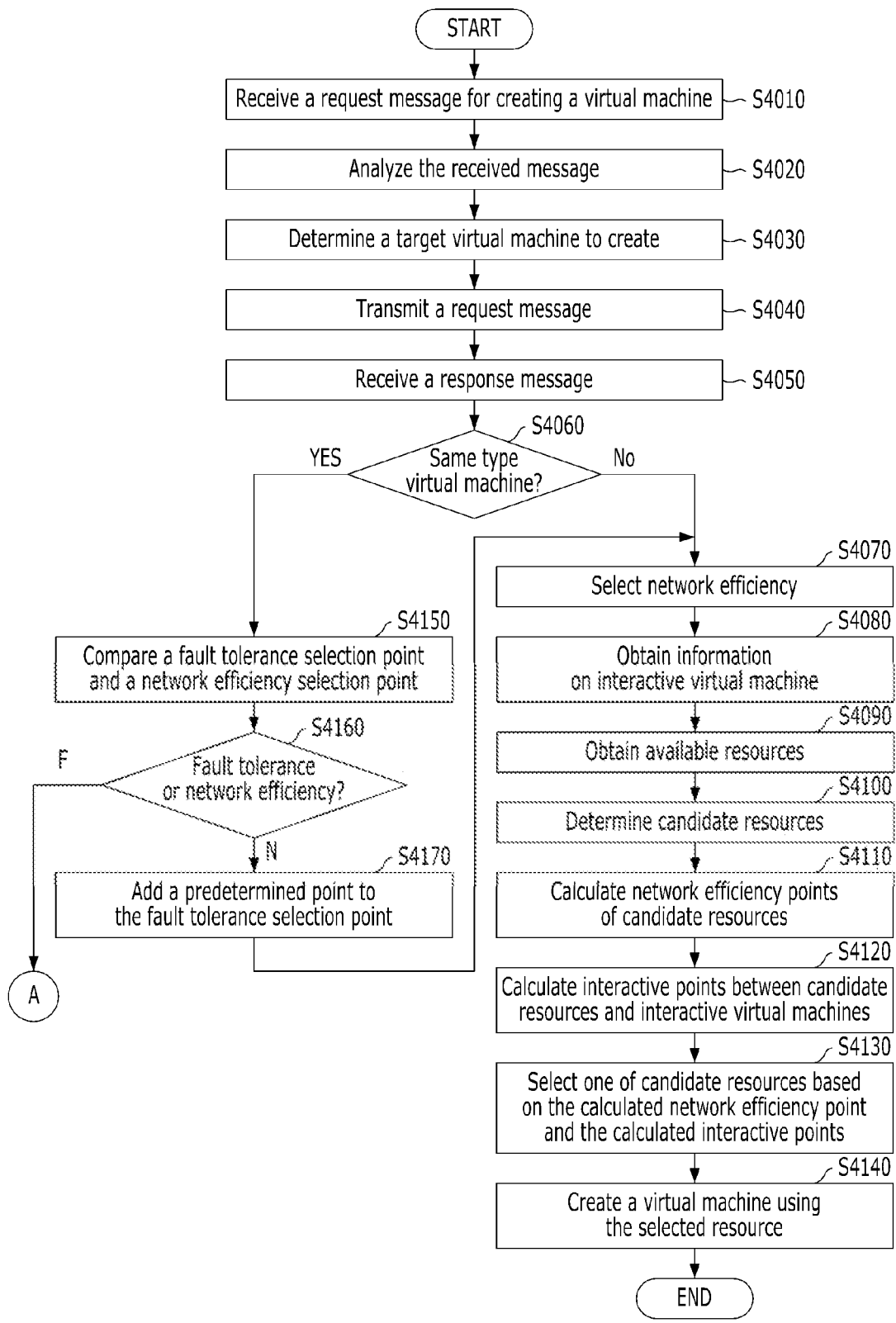
FIG. 4 illustrates selecting and allocating an optimal cloud computing resource to create a virtual machine in accordance with at least one embodiment.

FIG. 4 illustrates selecting and allocating an optimal cloud computing resource to create a virtual machine in accordance with at least one embodiment.

Referring to FIG. 4, a request message for creating a virtual machine may be received at step S4010. For example, control server 100 receives a request message from client device 400 through communication network 300 to create a virtual machine upon generation of a predetermined event. The request message may include information on a type of a target virtual machine to create, requirements of the target virtual machine, interactive virtual machines, operation to be performed by the target virtual machine, and so forth.

At step S4020, the received request message may be analyzed and information on the target virtual machine to create may be obtained from the analysis result. For example, control server 100 extracts information on a target virtual machine to create from the received requested message.

At step S4030, a virtual machine type of the target virtual machine may be determined based on the analysis result. For example, control server 100 detects a virtual machine type of the target virtual machine based on the extracted information. The virtual machine type may denote an operation to be performed by an associated virtual machine. When two virtual machines have the same virtual machine type, two virtual machines perform the same operation.

At step S4040, a request message for information on virtual machines included in a cloud computing system may be transmitted. For example, control server 100 may transmit a request message to cloud computing system 200 to provide information on virtual machines already created therein. The present invention is not limited thereto. For example, control server 100 may transmit a message with information on the target virtual machine to cloud computing system 200 in order to inquire whether at least one of the same type virtual machines is included therein.

At step S4050, a response message may be received. For example, in response to the request message, control server 100 may receive a response message from cloud computing system 200. The response message may include information on virtual machines included in cloud computing system 200 and various properties of the virtual machines such as a network load, a processing load, a data traffic amount, and so forth. In particular, the response message may include information on the interactive virtual machine and the same type virtual machine included in cloud computing system 200.

At step S4060, determination may be made so as whether a cloud computing system already includes the same type virtual machine as compared to the target virtual machine to create. For example, control server 100 determines whether the same type virtual machine is included in cloud computing system 200 based on the response message.

When the same type virtual machine is not included (No-S4060), network efficiency may be selected as a resource selection reference at step S4070. For example, when control server 100 determines that cloud computing system 200 does not include the same type virtual machine based on the received response message, control server 100 decides network efficiency as the resource selection reference.

At step S4080, information on at least one interactive virtual machine may be obtained. For example, control server 100 may extract information on the interactive virtual machine from the response message. The extracted information may include information on an interactive virtual machine associated with the target virtual machine, a processing resource allocated to the interactive virtual machine, a corresponding socket, a corresponding server, a corresponding cloud computing center, and so forth. In addition, the obtained information may include information on properties of the interactive virtual machine, such as a processing load, a network load, a data traffic amount, and so forth.

At step S4090, information on available resources may be obtained. For example, control server 100 transmits a request message to cloud computing system 200 to provide information on available resources based on requirements of the target virtual machine to create. In response to such a request message, control server 100 receives a response message including information on the available resources from cloud computing system 200.

At step S4100, candidate resources may be determined based on the obtained information. For example, control server 100 analyzes the obtained information and selects at least one of available resources based on the requirements of the target virtual machine. The requirements of the target virtual machine may include a processing power level, a memory capacity, a data transfer rate, and so forth.

At step S4110, network efficiency points of candidate resources in association with at least one interactive virtual machine may be calculated. For example, control server 100 calculates a network efficiency point of each candidate resource based on the information on the candidate resources and information on at least one the interactive virtual machine. When two interactive virtual machines A1 and A2 are included, one candidate resource B1 may have two network efficiency points: a first network efficiency point for A1-B1 and a second network efficiency point for A2-B1. Since the calculation method was described in detail with reference to FIG. 3, the detailed description thereof will be omitted herein.

At step S4120, interactive points of candidate resources in association with at least one interactive virtual machine may be calculated. For example, control server 100 may calculate interactive points of each candidate resource B1 in association with two interactive virtual machines A1 and A2. In this case, one candidate resource B1 may have two interactive points: a first interactive point for A1-B1 and a second interactive point for A2-B1. Such an interactive point may be calculated based various factors that influence communication between a candidate resource and an interactive virtual machine. For example, an expected data traffic amount between a candidate resource and an interactive virtual machine may be used as the interactive point, but the present invention is not limited thereto. Such information on the expected data traffic amount may be obtained from an associated cloud computing center. Since such calculation was already described in detail with FIG. 3, the detailed description thereof will be omitted herein.

When only one interactive virtual machine is included in association with each candidate resource, the step S4120 may be omitted. One having the highest network efficiency point may be selected as an optimal resource to create a target virtual machine.

At step S4130, one of the candidate resources may be selected based on the calculated network efficiency points and the interactive points. For example, the candidate resource B1's total point may be calculated as: the first network efficiency point (A1-B1)×the first interactive point (A1-B1)+the second network efficiency point (A2-B1)×the second interactive point (A2-B1). Total points of all candidate resources are calculated and compared to each other. Control server 100 selects one having the highest total point from the candidate resources.

At step S4190, creating of a virtual machine may be required to use the selected candidate resource. For example, control server 100 may transmit a request message to cloud computing system 200 to create a virtual machine using the selected candidate resource.

When the same type virtual machine is included in an associated cloud computing system (Yes-S4060), a fault tolerance selection point and a network efficiency selection point may be compared at step S4150. For example, when control server 100 determines that cloud computing system 200 includes the same type virtual machine based on the received response message, control server 100 compares the fault tolerance point and the network efficiency selection point to select one of the fault-tolerance and the network efficiency as the resource selection reference. Initially, such a fault tolerance selection point and a network efficiency selection point may be set with similar integer numbers, such as 10 for the fault tolerance selection point and 11 for the network efficiency selection point. The fault tolerance selection point and a network efficiency selection point may be set by at least one of a system designer, an operator, a service provider, and a user. However, the present invention is not limited thereto. The fault tolerance selection point and the network efficiency selection point may be set differently to select the preferred one between the fault tolerance and the network efficiency more frequently. For example, the fault tolerance selection point may be set with 55 points and the network efficiency selection point may be set with 40 points.

When the network efficiency selection point is greater than the fault tolerance selection point (N-S4160), the network efficiency may be selected as the resource selection reference and a predetermined point (e.g., integer number) may be added to the fault-tolerance selection point at step S4170. Then, the steps S4070 to S4140 may be performed to create the requested virtual machine using the optimal resource based on the network efficiency. Since such steps S4070 to S4140 were already described in detail above, the detailed description thereof will be omitted herein.

Figure 5:
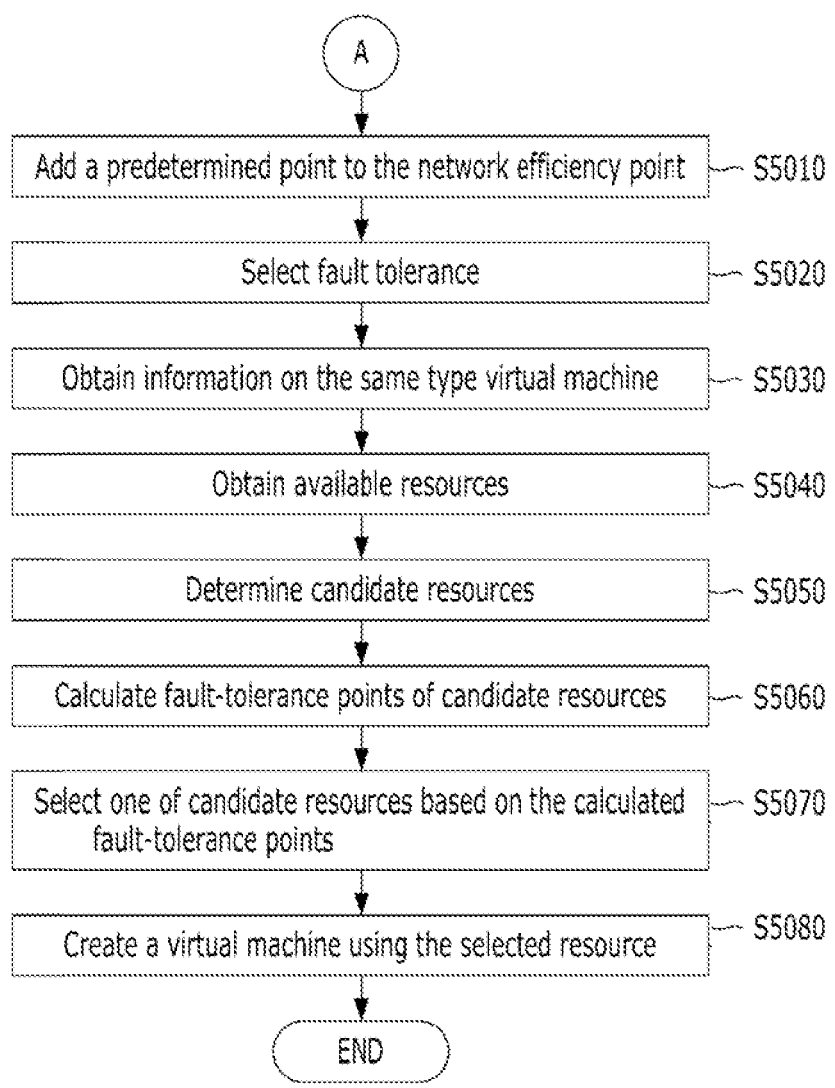
FIG. 5 illustrates selecting and allocating an optimal cloud computing resource to create a virtual machine in accordance with at least one embodiment.

FIG. 5 illustrates selecting and allocating an optimal cloud computing resource to create a virtual machine in accordance with at least one embodiment.

Referring to FIG. 5, when the fault-tolerance selection point is greater than the network efficiency selection point (F-S4160 in FIG. 4), a predetermined point (e.g., integer number) may be added to the network efficiency selection point at step S5010. At step S5020, the fault-tolerance may be selected as a resource selection reference.

At step S5030, information on the detected same type virtual machine may be obtained. For example, control server 100 may extract information on the same type virtual machine from the response message. The extracted information may include information on a processing resource allocated to create the same type virtual machine, a corresponding socket, a corresponding server, a corresponding cloud computing center, and so forth.

At step S5040, information on available resources may be obtained. For example, control server 100 transmits a request message to cloud computing system 200 to provide information on available resources based on requirements of the target virtual machine to create. In response to such a request message, control server 100 receives a response message including information on the available resources from cloud computing system 200.

At step S5050, candidate resources may be determined based on the obtained information. For example, control server 100 analyzes the obtained information and selects at least one of available resources based on the requirements of the target virtual machine. The requirements of the target virtual machine may include a processing power level, a memory capacity, a data transfer rate, and so forth.

At step S5060, a fault-tolerance point of each candidate resource may be calculated. For example, control server 100 calculates a fault-tolerance point of each candidate resource based on the information on the candidate resources and information on the same type virtual machine. Since the calculation method was described in detail with reference to FIG. 3, the detailed description thereof will be omitted herein.

At step S5070, one of the candidate resources may be selected based on the calculated fault-tolerance points. For example, control server 100 selects one having the highest fault-tolerance point from the candidate resources.

At step S5080, creating of a virtual machine may be required to use the selected candidate resource. For example, control server 100 may transmit a request message to cloud computing system 200 to create a virtual machine using the selected candidate resource.

When a plurality of same type virtual machines are detected, one of the same type virtual machines may be selected, as a representative same type virtual machine, based on various factors which may be set by at least one of a system designer, an operation, a user, and a service provider. For example, a predetermined property of a server associated with each of the multiple same type virtual machines may be determined and a virtual machine included in a server having a highest level or a lowest level in the predetermined property may be selected as the representative same type virtual machine from the multiple same type virtual machines. Such a predetermined property may include a processing power, a traffic amount, a network bandwidth, a storage space, and so forth. A fault-tolerance point of each candidate processing resource may be calculated based on a common lowest hierarchical layer between a processing source allocated to the selected same type virtual machine and each candidate processing resource Furthermore, when a plurality of same type virtual machines are detected, one of a server and a socket including the most same type virtual machines may be selected from servers and sockets associated with the detected multiple same type virtual machines. A fault-tolerance point of each candidate processing resource may be calculated based on a common lowest hierarchical layer between the selected server or the selected socket and each candidate processing resource.

In accordance with at least one embodiment, a resource selection reference may be selected in response to a user selection. That is, although the same type virtual machine is included in an associated cloud computing system, control server 100 may select one of fault-tolerance and network efficiency in response to the user selection.

As described, a method of calculating a network efficiency point and a fault-tolerance point may be modified in various ways. The present invention is not limited to one particular method of calculating a network efficiency point and a fault-tolerance point.

Figure 6:
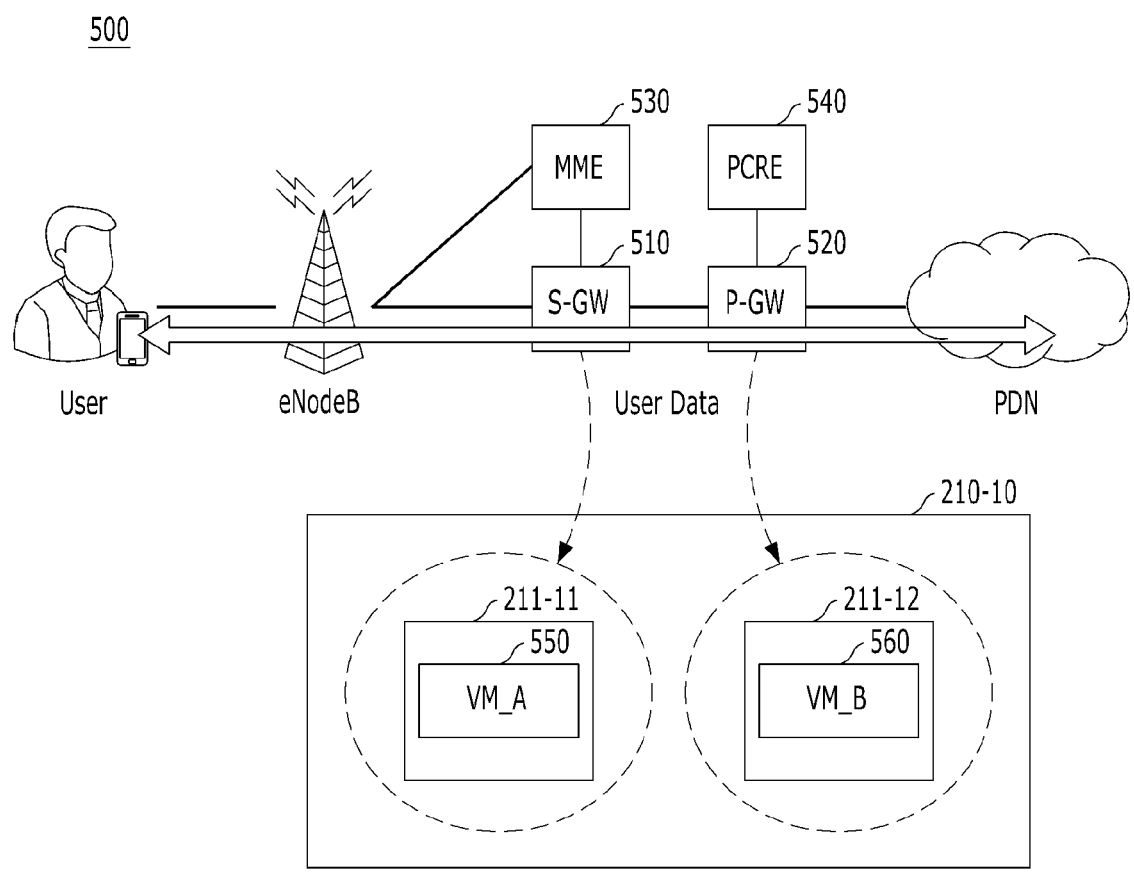
FIG. 6 illustrates virtualizing an evolved packet core network in accordance with at least one embodiment.

FIG. 6 illustrates virtualizing an evolved packet core network in accordance with at least one embodiment.

Referring to FIG. 6, through network functionality virtualization (NFV), evolved packet core network 500 may be virtualized with virtual machines using a cloud computing system (e.g., cloud computing system 200). For example, evolved packet core network 500 may be designed and defined by $3^{rd}$ generation partnership project (3GPP) in order to support LTE network. Such evolved packet core network 500 may include various hardware computing devices, such as serving-gateway (S-GW) 510 and packet data network gateway (P-GW) 520 for providing user data, mobile management entity (MME) 530 for processing signal data, and policy and charging rules functions (PCRF) 540 and home subscriber service (HSS) for performing supplementary functions.

Such hardware computing devices may be virtualized using the method for selecting and allocating optimal cloud computing resources for creating virtual machines in accordance with at least one embodiment. For example, since S-GW 510 and P-GW 520 are interactive relation but not performing the same operation, control server 100 may select network efficiency as a resource selection reference. Then, a network efficiency point of each candidate resource in clouding computing system 200 as described in FIG. 2. Based on the calculation, control server 100 may select processor P1 in core 211-11 and processor P2 in core 211-21 in first socket 211-10. That is, S-GW 510 and P-GW 520 may be virtualized as virtual machines VM_A instance 550 and VM_B instance 560 by selecting cloud computing resources P1 and P2 in socket 211-10.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of selecting and allocating one of resources in a cloud computing system to create a virtual machine by a control server coupled to the cloud computing system, the method comprising:
   determining, by the control server, a resource selection reference by selecting one of fault-tolerance and network efficiency upon receipt of a request message for creating a target virtual machine;
   calculating, by the control server, at least one of a fault-tolerance point, a network efficiency point, an interactive point of each candidate resource according to the selected resource selection reference; and
   selecting, by the control server, one of candidate resources to create a requested virtual machine based on at least one of the calculated fault-tolerance point and the calculated network efficiency point of the candidate resources,
   wherein the selectin comprises:
   creating the target virtual machine using the resource having one of a highest fault-tolerance point and a highest network efficiency point.

2. The method of claim 1, wherein the determining a resource selection reference comprises:
   receiving the request message for creating the target virtual machine from a client device through a communication network;
   detecting a virtual machine type of the target virtual machine by analyzing information included in the request message; and
   determining whether the cloud computing system includes a virtual machine having a virtual machine type identical to the target virtual machine.

3. The method of claim 1, wherein the determining a resource selection reference comprises:
   selecting, as the resource selection reference, one of the fault-tolerance and the network efficiency based on a fault tolerance selection point and a network efficiency selection point when the cloud computing system includes a same type virtual machine having a virtual machine type identical to the target virtual machine; and
   otherwise, selecting the network efficiency as the resource selection reference.

4. The method of claim 1, comprising:
   transmitting an information request message for requiring information on virtual machines and available cloud computing resources to the cloud computing system through a communication network;
   receiving a response message from the cloud computing system in response to the information request message; and
   obtaining information on at least one of a same type virtual machine, an interactive virtual machine, a resource allocated to each one of the same type virtual machine and the interactive virtual machine, and a hierarchical layer of the resource.

5. The method of claim 1, wherein the calculating comprises:
   calculating the network efficiency point and the interactive point of each candidate resource when the resource selection reference is selected as the network efficiency; and
   calculating the fault-tolerance point of each candidate resource when the resource selection reference is selected as the fault-tolerance.

6. The method of claim 5, wherein the calculating the network efficiency point comprises:
   obtaining information on an interactive virtual resource and available resources from a response message received from the cloud computing system through a communication network;
   selecting resources matched with requirements of the target virtual machine from the available resources, as the candidate resources; and
   calculating the network efficiency point and the interactive point of each candidate resource based on the obtained information on the interactive virtual resource and the available resources.

7. The method of claim 6, wherein the calculating the network efficiency point comprising:
   determining a common lowest hierarchical layer between a resource allocated to the interactive virtual machine and a resource allocated to each candidate resource; and
   assigning a predetermined point, as the network efficiency point, to each candidate response based on the determined common lowest hierarchical layer.

8. The method of claim 7, wherein the assigning comprises:
   assigning 40 points to the candidate resource when a common lowest hierarchical layer between a hierarchical layer of the candidate resource and a hierarchical layer of the interactive virtual machine is a socket layer;

assigning 30 points to the candidate resource when a common lowest hierarchical layer between a hierarchical layer of the candidate processing resource and a hierarchical layer of the interactive virtual machine is a server layer;

assigning 20 points to the candidate resource when a common lowest hierarchical layer between a hierarchical layer of the candidate processing resource and a hierarchical layer of the interactive virtual machine is a clod computing center layer; and assigning 10 points to the candidate resource when the candidate resource and a resource of the interactive virtual machine are included in different cloud computing centers.

9. The method of claim 5, wherein the calculating the fault-tolerance point comprises:

obtaining information on a same type virtual machine and available resources from a response message received from the cloud computing system through a communication network;

selecting resources matched with requirements of the target virtual machine from the available resources, as the candidate resources; and calculating the fault-tolerance point of each candidate resource based on the obtained information on the same type virtual machine and the available resources.

10. The method of claim 9, wherein the calculating the fault-tolerance point comprises:

determining a common lowest hierarchical layer between a resource allocated to the same type virtual machine and a resource allocated to each candidate resource; and assigning a predetermined point, as the fault-tolerance point, to each candidate resource based on the determined common lowest hierarchical layer, wherein one having a highest fault-tolerance point is selected from the candidate resources and the target virtual machine is created using the selected one.

11. The method of claim 10, wherein the assigning a predetermined point comprises:

assigning 40 points to a candidate resource when there is no common hierarchical layer between the candidate resource and a resource allocated to the same type virtual machines;

assigning 30 points to the candidate resource when a common lowest hierarchical layer between the candidate resource and a resource allocated to the same type virtual machines is a cloud computing center layer;

assigning 20 points to the candidate resource when a common lowest hierarchical layer between the candidate resource and a resource of the same type virtual machines is a server layer; and assigning 10 points to the candidate resource when a common lowest hierarchical layer between the candidate resource and a resource allocated to the same type virtual machines is a socket layer.

12. An apparatus for selecting and allocating one of resources in a cloud computing system to create a virtual machine, the apparatus comprising:

at least one of processors configured to performing operations for selecting and allocating resources to create virtual machine;

at least one of memories configured to store information and data;

communication circuits to communicate with other entities through communication networks;

wherein the at least one of processors is configured to:

determine, by the control server, a resource selection reference by selecting one of fault-tolerance and network efficiency upon receipt of a request message for creating a target virtual machine;

calculate, by the control server, at least one of a fault-tolerance point, a network efficiency point, and an interactive point of each candidate resource according to the selected resource selection reference;

select, by the control server, one of candidate resources to create a requested virtual machine based on at least one of the calculated fault-tolerance point and the calculated network efficiency point of the candidate resources; and create, by the control server, the target virtual machine using the resource having one of a highest fault-tolerance point and a highest network efficiency point.

13. The apparatus of claim 12, wherein the at least one of processors is configured to:

receive the request message for creating e target virtual machine from a client device through a communication network;

detect a virtual machine type of the target virtual machine by analyzing information included in the request message; and determine whether the cloud computing system includes a virtual machine having a virtual machine type identical to the target virtual machine.

14. The apparatus of claim 12, wherein the at least one of processors is configured to:

select one of the fault-tolerance and the network efficiency as the resource selection reference based on a fault tolerance point and a network efficiency point when the cloud computing system includes a same type virtual machine having a virtual machine type identical to the target virtual machine; and otherwise, selecting the network efficiency as the resource selection reference.

15. The apparatus of claim 12, wherein the at least one of processors is configured to:

calculate the network efficiency point and the interactive point of each candidate resource when the resource selection reference is selected as the network efficiency; and calculate the fault-tolerance point of each candidate resource when the resource selection reference is selected as the fault-tolerance.

16. The apparatus of claim 15, wherein the at least one of processors is configured to:

obtain information on an interactive virtual resource and available resources from a response message received from the cloud computing system through a communication network;

select resources matched with requirements of the target virtual machine from the available resources, as the candidate resources; and calculate the network efficiency point and the interactive point of each candidate resource based on the obtained information on the interactive virtual resource and the available resources.

17. The apparatus of claim 15, wherein the at least one of processors is configured to:

determining a common lowest hierarchical layer between a resource allocated to the interactive virtual machine and a resource allocated to each candidate resource; and assigning a predetermined point, as the network efficiency point, to each candidate response based on the determined common lowest hierarchical layer.

18. The apparatus of claim 15, wherein the at least one of processors is configured to:

obtain information on a same type virtual machine and available resources from a response message received from the cloud computing system through a communication network;

select resources matched with requirements of the target virtual machine from the available resources, as the candidate resources; and calculate the fault-tolerance point of each candidate resource based on the obtained information on the same type virtual machine and the available resources.

19. The apparatus of claim 15, wherein the at least one of processors is configured to:

determine a common lowest hierarchical layer between a resource allocated to t e same type virtual machine and a resource allocated to each candidate resource; and assign a predetermined point, as the fault-tolerance point, to each candidate resource based on the determined common lowest hierarchical layer, wherein one having a highest fault-tolerance point is selected from the candidate resources and the target virtual machine is created using the selected one.

* * * * *

UNITED STATES PATENT AND TRADEMARK OFFICE
CERTIFICATE OF CORRECTION

| | |
|---|---|
| PATENT NO. | : 9,465,641 B2 |
| APPLICATION NO. | : 14/582833 |
| DATED | : October 11, 2016 |
| INVENTOR(S) | : Jung-Hun Ryu et al. |

Page 1 of 1

It is certified that error appears in the above-identified patent and that said Letters Patent is hereby corrected as shown below:

In the claims

In claim 1, column 15, line 59, "selectin" should be amended --selecting--.

In claim 13, column 18, line 23, "for creating e target" should be amended --for creating the target--.

In claim 19, column 19, line 23, "allocated to t e same" should be amended --allocated to the same--.

Signed and Sealed this
Sixth Day of December, 2016

Michelle K. Lee
*Director of the United States Patent and Trademark Office*